(12) United States Patent
Moore

(10) Patent No.: US 10,824,338 B2
(45) Date of Patent: Nov. 3, 2020

(54) USING VARIABLE SIZED UNCOMPRESSED DATA BLOCKS TO ADDRESS FILE POSITIONS WHEN SIMULTANEOUSLY COMPRESSING MULTIPLE BLOCKS

(71) Applicant: EMC IP Holding Company LLC, Hopkinton, MA (US)

(72) Inventor: Scott Moore, Fredericksburg, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 119 days.

(21) Appl. No.: 16/179,551

(22) Filed: Nov. 2, 2018

(65) Prior Publication Data

US 2020/0142604 A1    May 7, 2020

(51) Int. Cl.
G06F 3/06    (2006.01)

(52) U.S. Cl.
CPC ............ *G06F 3/0608* (2013.01); *G06F 3/064* (2013.01); *G06F 3/067* (2013.01); *G06F 3/0661* (2013.01)

(58) Field of Classification Search
CPC ........ G06F 3/064; G06F 3/0608; G06F 3/067; G06F 3/0661; G06F 3/06
USPC ........................................................ 707/736
See application file for complete search history.

(56) References Cited

U.S. PATENT DOCUMENTS

| | | | | |
|---|---|---|---|---|
| 6,608,924 B2 * | 8/2003 | Soliman | ............... | G06K 9/6223 382/157 |
| 7,280,057 B2 * | 10/2007 | Delfs | ...................... | H03M 7/30 341/87 |
| 7,447,814 B1 * | 11/2008 | Ekman | .................... | G06F 12/08 710/68 |
| 8,209,303 B2 * | 6/2012 | Vella | ................... | G06F 11/1435 707/693 |
| 9,141,301 B1 * | 9/2015 | Wallace | .............. | G06F 16/1756 |
| 9,678,879 B2 * | 6/2017 | Whitehouse | ........ | G06F 12/0866 |
| 10,509,580 B2 * | 12/2019 | Yap | ......................... | H03M 7/30 |
| 2012/0109909 A1 * | 5/2012 | Hugly | ................. | H03M 7/3084 707/693 |
| 2014/0136892 A1 * | 5/2014 | Wu | ....................... | G06F 3/0686 714/15 |
| 2015/0146317 A1 * | 5/2015 | Abe | .................... | G11B 5/00817 360/13 |
| 2016/0077757 A1 * | 3/2016 | Hasegawa | ............. | G06F 3/0622 711/111 |
| 2018/0232420 A1 * | 8/2018 | Kaldewey | ......... | G06F 16/24561 |
| 2020/0014399 A1 * | 1/2020 | Parker | ..................... | G06F 16/13 |

* cited by examiner

*Primary Examiner* — Hicham Skhoun
(74) *Attorney, Agent, or Firm* — Ryan, Mason & Lewis, LLP

(57) ABSTRACT

An apparatus in one embodiment comprises at least one processing device comprising a processor coupled to a memory. The processing device is configured to determine a plurality of block offsets indicating respective positions of data within a plurality of uncompressed data blocks respectively encoded to have variable sizes, to generate a block index file comprising the plurality of block offsets, a plurality of block positions and a plurality of block sizes respectively corresponding to the plurality of uncompressed data blocks, to compress data from at least one uncompressed data block of the plurality of uncompressed data blocks to at least one compressed data block of a plurality of compressed data blocks, and to utilize the block index file in connection with decompressing the compressed data.

20 Claims, 5 Drawing Sheets

400

US 10,824,338 B2

USING VARIABLE SIZED UNCOMPRESSED DATA BLOCKS TO ADDRESS FILE POSITIONS WHEN SIMULTANEOUSLY COMPRESSING MULTIPLE BLOCKS

FIELD

The field relates generally to information processing systems, and more particularly to storage in information processing systems.

BACKGROUND

A wide variety of different types of data compression are known. For example, in some cases, data compression is implemented as a data service that is used to compress unique segments of a file in order to reduce the space needed for storage on a storage device, such as a solid state drive or hard disk drive. Data compression in a block-based storage system reduces the size of data on a storage device, typically increasing available capacity up to about 50 percent. Compression can typically be enabled automatically and can operate in the background to avoid performance degradation.

Compression algorithms typically require a large amount of central processing unit (CPU) time. For example, some conventional compression techniques require compressing one block at a time and waiting for the compression to finish for a given block before starting a new block. Although relatively simple to implement and while also providing adequate compression, the efficiency of such techniques is poor and does not scale to larger compression operations.

In order to achieve better performance, compression can be scaled over multiple CPU cores, but not all compression algorithms support scaling compression over multiple CPU cores. Accordingly, methods have been developed to compress large files (e.g., measured in gigabytes) in parallel using any compression coder/decoder (codec). These methods require breaking the file into smaller sized blocks and compressing those blocks in parallel, up to the number of CPU cores available. However, if the file being written contains objects that are indexed by position, such as required by an indexing database, the position (e.g., offset) must be calculated prior to compressing the block and prior to knowing how many blocks might be concurrently compressed. In other words, the position must be calculated while waiting for the block in question to be compressed and written to a storage device.

Some known methods require that for any given compressed file data block, the size of the uncompressed data block must remain constant throughout the file for the offset calculations to work correctly. For example, the NetWitness® Database (NWDB), available from Dell EMC, incorporates such compression functionality in connection with fixed size uncompressed data blocks.

SUMMARY

In one embodiment, an apparatus comprises at least one processing device comprising a processor coupled to a memory. The processing device is configured to determine a plurality of block offsets indicating respective positions of data within a plurality of uncompressed data blocks respectively encoded to have variable sizes, to generate a block index file comprising the plurality of block offsets, a plurality of block positions and a plurality of block sizes respectively corresponding to the plurality of uncompressed data blocks, to compress data from at least one uncompressed data block of the plurality of uncompressed data blocks to at least one compressed data block of a plurality of compressed data blocks, and to utilize the block index file in connection with decompressing the compressed data.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
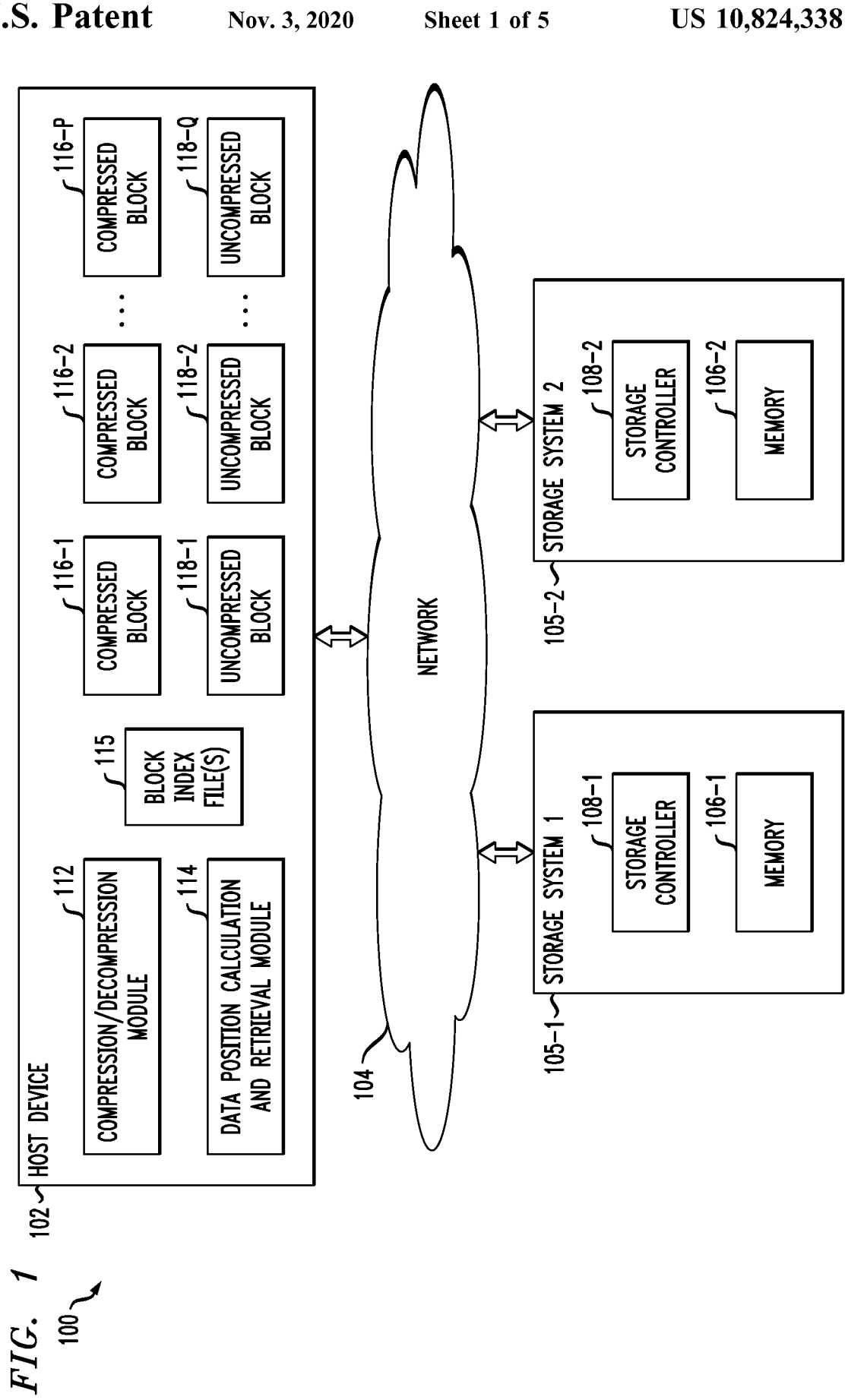
FIG. 1 is a block diagram of an information processing system comprising a host device configured with functionality for data compression from a plurality of uncompressed data blocks having variable sizes in an illustrative embodiment.

FIG. 1 shows an information processing system 100 configured in accordance with an illustrative embodiment. The information processing system 100 comprises a host device 102, which may comprise one of a plurality of host devices of a computer system. The host device 102 communicates over a network 104 with first and second storage systems 105-1 and 105-2, also denoted as Storage System 1 and Storage System 2, respectively. The storage systems 105-1 and 105-2 are collectively referred to herein as storage systems 105. The host device 102 and storage systems 105 may be part of an enterprise computing and storage system, a cloud-based system or another type of system.

The host device 102 and storage systems 105 illustratively comprise respective processing devices of one or more processing platforms. For example, the host device 102 and the storage systems 105 can each comprise one or more processing devices each having a processor and a memory, possibly implementing virtual machines and/or containers, although numerous other configurations are possible.

The host device 102 and the storage systems 105 can additionally or alternatively be part of cloud infrastructure such as an Amazon Web Services (AWS) system. Other examples of cloud-based systems that can be used to provide one or more of host device 102 and storage systems 105 include Google Cloud Platform (GCP) and Microsoft Azure.

The host device 102 is configured to write data to and read data from the storage systems 105. The host device 102 and the storage systems 105 may be implemented on a common processing platform, or on separate processing platforms. A wide variety of other types of host devices can be used in other embodiments.

The host device 102 in some embodiments illustratively provides compute services such as execution of one or more applications on behalf of each of one or more users associated with the host device 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage systems 105 are accessible to the host device 102 over the network 104. The storage system 105-1 comprises a plurality of memory components 106-1 and an associated storage controller 108-1. Similarly, the storage system 105-2 comprises a plurality of memory components 106-2 and an associated storage controller 108-2. The memory components 106-1 and 106-2 are collectively referred to herein as memory components 106. The storage controllers 108-1 and 108-2 are collectively referred to as storage controllers 108. Although two storage systems 105 including corresponding memory components 106 and storage controllers 108 are shown, it is to be understood that the embodiments of the present invention are not necessarily limited thereto, and may include more or less than two storage systems 105.

The memory components 106 illustratively comprise storage devices such as, for example, buffers, caches, hard disk drives and solid state drives (SSDs). Such SSDs are implemented using non-volatile memory (NVM) devices such as flash memory. Other types of NVM devices that can be used to implement at least a portion of the memory components 106 include non-volatile random access memory (NVRAM), phase-change RAM (PC-RAM) and magnetic RAM (MRAM). These and various combinations of multiple different types of NVM devices may also be used.

It is to be appreciated that other types of storage devices can be used as the memory components 106 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, at least one of the storage systems 105 illustratively comprises a storage array, including by way of example VNX® and Symmetrix VMAX® storage arrays from Dell EMC of Hopkinton, Mass., which can be used to implement one or both of storage systems 105 in other embodiments.

The term "storage system" as used herein is therefore intended to be broadly construed. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The host device 102 in the FIG. 1 embodiment includes a compression/decompression module 112 and a data position calculation and retrieval module 114. The compression/decompression and data position calculation and retrieval modules 112 and 114 are configured to control performance of a data compression and decompression process such as that illustrated in the flow diagram of FIG. 3.

As shown in FIG. 1, the host device 102 includes one or more block index files 115, a plurality of compressed data blocks 116-1, 116-2, . . . 116-P (collectively referred to herein as compressed blocks 116), and a plurality of uncompressed data blocks 118-1, 118-2, . . . 118-Q (collectively referred to herein as uncompressed blocks 118) stored on one or more storage devices of the host device 102. The variables P and Q, and other index variables K, L, and M used herein are assumed to be arbitrary positive integers greater than or equal to two.

The terms "block" or "data block" herein are intended to be broadly construed. A given block or data block, as the terms are broadly used herein, can comprise, for example, an identifiable unit of data comprising a contiguous sequence of memory units, such as bits or bytes, and having a size based on the number of memory units, referred to herein as "block size". According to embodiments of the present invention, for any given compressed data block, the size of the corresponding uncompressed data block is variable. Blocked data may be stored in a data buffer and read, written, compressed or decompressed a whole block at a time. Block data compression reduces the size of data on a storage device, enabling more efficient storage capacity utilization on a storage system.

The compression/decompression module 112 controls reading, writing, compression and decompression operations for compressed and uncompressed blocks of data 116 and 118, and the data position calculation and retrieval module 114 controls the calculation and determination of block positions, block offsets, and block size, and generation and maintenance of the block index file(s) 115, as described further herein. Compression/decompression algorithms used in accordance with embodiments of the present invention are lossless, and can include, but are not necessarily limited to, GNU zip (GZip), Lempel—Ziv—Markov chain algorithm (LZMA), and BZip2.

In accordance with an embodiment of the present invention, for any given compressed data block, the uncompressed data block size can be variable throughout the file. For example, referring to FIG. 4, uncompressed data blocks 418-3, 418-4 and 418-5 have variable block sizes of $n_3$, $n_4$, and $n_5$, respectively. In the diagram in FIG. 4, which is a non-limiting operational example, blocks 1 and 2 (416-1 and 416-2) have already been compressed. The uncompressed data blocks corresponding to compressed blocks 1 and 2 (416-1 and 416-2) are not shown. The variable block sizes of the uncompressed data blocks corresponding to blocks 1 and 2 (416-1 and 416-2) are represented as $n_1$ and $n_2$. In general, the variable block size of an uncompressed data block is represented as $n_{block\ \#}$.

Figure 4:
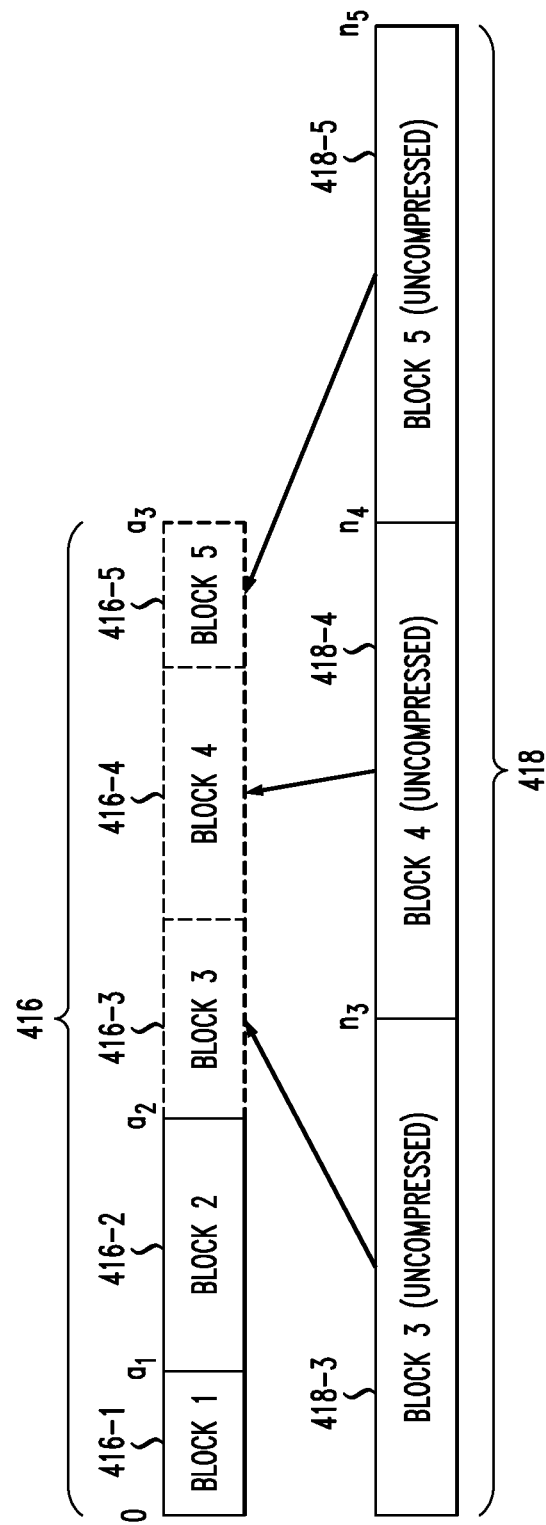
FIG. 4 shows an example of compressed and uncompressed data blocks in an illustrative embodiment.

In the operational example 400 in FIG. 4, blocks 3, 4 and 5 (416-3, 416-4 and 416-5) will be compressed blocks, but have not yet finished compressing. Data has already been written to buffers of blocks 1 and 2 (416-1 and 416-2), and the blocks 1 and 2 (416-1 and 416-2) were compressed and written to a storage device. 0 represents the block position for the start of block 1 416-1, $a_1$ represents the block position for the start of block 2 416-2 and $a_2$ represents the block position for the start of block 3 416-3. Blocks 3, 4 and 5 (416-3, 416-4 and 416-5) are waiting to be compressed. Data is written to blocks 3, 4 and 5 (416-3, 416-4 and 416-5) in order after block 2 416-2. For example, writing to a buffer for block 4 416-4 cannot proceed until all writing to the buffer for block 3 416-3 has finished. With the understanding that the blocks are uncompressed buffers prior to compression and writing to a storage device, once writing to the block 3 buffer is complete (e.g., block 3's memory buffer is full), it is then compressed and written to the storage device at position $a_2$ in the file (the end of the file). Block 4 416-4 follows the same progression as block 3 416-3, such that the buffer for block 5 416-5 will be written to only after block 4's memory buffer is full. At the same time as compressing and writing to the storage device for a previous block, new data can be written to buffers waiting in memory.

The current block position for blocks 3, 4 and 5 (416-3, 416-4 and 416-5) waiting to be compressed) is $a_2$. In the operational example, there are 2 blocks in memory that are currently being compressed (blocks 3 and 4 416-3 and 416-4) and one block (block 5 416-5) to which data is still being written, and will be compressed after writing is complete. The block offsets range from zero up to $n_5$, where $n_{block\ \#}$ represents the uncompressed block size, respectively for each uncompressed block.

In accordance with an embodiment of the present invention, data that is written to a storage device in block 3 416-3 will have a block position of $a_2$ and a block offset between 0 and $n_3$ (exclusive). The block offset is an offset inside the block itself. If the offset was inclusive instead of exclusive of $n_3$, then it would be the start of the next block, because offsets are zero-based. The block offset must point to a valid position within the block it is referencing. $n_3$ is a position one past the last valid position in block 3. In this example, block 4 416-4 has a block position of $a_2$, and a starting block offset of $n_3$ and ending at $n_4$ (exclusive). The offsets for block 4 416-4 are not between 0 and $n_4$ because an offset of 0 would be in block 3 416-3. For data to be in block 4, it must start at $n_3$, which is one past the last valid position for block 3. Block 5 416-5 has a block position of $a_2$ and a starting block offset of $n_4$ and ending at $n_5$ (exclusive).

In keeping with this example, data written to block 4 416-4 has a block position of $a_2$ and a block offset between $n_3$ (inclusive) and $n_4$ (exclusive), and data written to block 5 has a block position of $a_2$ and a block offset between $n_4$ (inclusive) and $n_5$ (exclusive). If data is finished being compressed and written to a storage device for block 5 416-5 before starting writing to a buffer of a subsequent block (e.g., block 6) (not shown), then block 6 will have a starting block position of $a_3$ and a block offset starting at zero and ending at $n_6$ (exclusive). In order for an offset to return to start at zero, all previous blocks must be compressed and written to a storage device. For example, assuming blocks 3, 4 and 5 are now compressed and written to a storage device, the end of the file has now grown and is designated as $a_3$. New data comes in and block 6 is created. Block 6 has a block position of $a_3$ and a block offset of zero, because in this scenario, there are no earlier blocks that need to be written in memory. If writing to the block 6 buffer finishes and a block 7 (not shown) is created before block 6 is compressed and written to the storage device, then block 7 also has a block position of $a_3$ and a starting block offset of $n_6$, where $n_6$ is the byte count of uncompressed bytes in block 6.

To maintain direct access to any compressed block (e.g., compressed blocks 116 or 416), the block index file 115, which is a separate file from the compressed and uncompressed blocks 116 and 118 (or 416 and 418), includes for each uncompressed data block, a designated first number of bytes for a block offset and a designated second number of bytes for a block size. For example, according to a non-limiting embodiment of the present invention, the block index file 115 maintains a 64-bit (8 byte) offset for each uncompressed data block and 4 bytes for the size of the uncompressed data block, for a total of 12 bytes per uncompressed data block. The block offsets in the block index file 115 are used by the data position calculation and retrieval module 114 to find, retrieve and decompress data from any of the compressed blocks 116 by (i) calculating the offset needed (e.g., block number of the uncompressed block (e.g., 1, 2, 3 . . . Q)*12 (bytes)); (ii) reading in the offset and uncompressed size for that location; and (iii) moving a block pointer directly in a compressed file to the corresponding compressed block to be decompressed.

More specifically, the index file 115 has a 64 bit block position/offset encoded value and a 4 byte uncompressed block size (e.g., length). This encoded 64 bit field is comprised of two parts: the block position, which is 36 bits and the block offset, which is 28 bits. The block position is the byte offset from the start of the file (zero based), which indicates the start of the compressed block (e.g., $a_1$, $a_2$, $a_3$ in FIG. 4) (i.e., where reading from the compressed block starts). The remaining 28 bits (e.g., block offset) are the encoded position within the uncompressed block where the data is located. The block offset refers to a byte offset from the start of an uncompressed block that indicates the position of the stored data within the uncompressed data block, except in those cases where the offset is greater than the size of the uncompressed block, which will be discussed in further detail herein below. Block offsets have also been discussed in more detail in connection with FIG. 4. It is to be understood that the embodiments of the present invention are not necessarily limited to the block position being encoded in 36 bits and to the block offset being encoded in 28 bits, and the block position and block offset may be encoded using different numbers of bits.

In accordance with embodiments of the present invention, the size of a compressed block on disk is determined by a 4 byte length preceding each compressed block in the file. The size of an uncompressed block is the 4 bytes that follow the block position/offset (8 bytes) for a total of 12 bytes. To determine the uncompressed size of the next block, the system must read ahead in the index file to the first block position different from the current block and read in the 4 bytes for its uncompressed size.

The following sets forth an order of processing to read and access compressed data, according to an embodiment of the present invention.

1) Read in the 64 bit block position/offset.
2) Read in the 32 bit uncompressed block size.
3) Within the 64 bit encoded block position/offset, verify whether the block offset is less than the uncompressed block size. If true, proceed to step 4). If false, proceed to step 5).
4) If the block offset is less than the uncompressed block size, then the data is within the compressed block on disk pointed to by the encoded 64 bit position. Move the compressed file pointer to the start of the block (designated as "block position" (e.g., $a_1$, $a_2$, $a_3$ in FIG. 4)). Skip to step 6).
5) If the block offset is greater than or equal to the uncompressed block size, then the sought after data is not within this compressed block, as the offset exceeds the uncompressed block size. Then, read ahead in the index file 115 to find the first entry describing the next compressed block (this would be the index entry where the block position changes). Then read in the uncompressed block size and determine if the block offset falls within this block by adding the previous block's uncompressed size to the next block's uncompressed size and comparing the sum to the offset value. If the offset value is less than the total of the uncompressed sizes, then the sought after data is within the next compressed block. If the offset value is greater than the total of the uncompressed sizes, step 5) is repeated until the offset value is less than a total of uncompressed sizes, and the compressed block in which the sought after data is located is determined. In order to correctly perform the offset calculation, each of the previous and current uncompressed block sizes must be added together. Once the compressed block in which the sought after data is located is determined, proceed to step 6).
6) Move the compressed file pointer to the start of the compressed block in which the sought after data is located. Read in the compressed block size (4 bytes).
7) Using the compressed block size from step 6), read in the whole compressed block.
8) Decompress the block into a memory buffer.
9) Within the memory buffer, calculate the offset of the data using the following formula: (total size of previous uncompressed blocks where data was not found)—(offset number from index file)=Position in buffer to start reading data object
10) Move to position in memory buffer from step 9)
11) Read in data object from the memory buffer.

According to an embodiment of the present invention, within the compressed file, preceding each compressed block written, there is a 4 byte block length that specifies the size of the compressed block on the storage device. This is how the system knows how much compressed data to read in before decompressing the block. The block starting positions point to that 4 byte length and not the actual start of the block data. The total length of a compressed block is therefore the compressed size of the block, plus those 4 extra bytes.

In order for the offset calculations to work properly, the block index file 115 is required to not be compressed. According to an embodiment of the present invention, the total of 12 bytes per uncompressed data block in the block index file 115 is very small compared to the amount of data compressed in the compressed data blocks 116 and does not significantly add to the overall size overhead.

According to an embodiment of the present invention, the uncompressed block size is large enough for good compression, but small enough to be compressed in a relatively short amount of time. In a non-limiting example, the uncompressed block size can be in a range of 256 KB to 8 MBs per block.

The embodiments of the present invention require data to be written at the end of a file. Bytes are not written or updated at positions in a file other than the end. For example, when a file is first created (zero bytes), the beginning of the file is also the end of the file. Therefore, writing is to the end of the file, which is position zero.

According to an embodiment of the present invention, each block to be compressed and written to a storage device has encoded the 64 bit integer including the block position and the block offset. The last block written to a file cannot exceed a byte offset from the beginning of the file greater than $2^{36}$ (or 68719476736). In other words, if the block position maximum size is 36 bits, in order to prevent overflow of the 36 bits, it would not be possible to write to a compressed file that exceeds $2^{36}$ bytes in size.

The block offset refers to a byte offset from the start of an uncompressed block that indicates the position of the stored data within the uncompressed data block. The block offset never indicates a position within a block that is compressed, as this would be data that is unreadable to anything but a compression codec.

According to an embodiment of the present invention, the block offset can be larger than the size of a current uncompressed block and when this happens, this means the data is in a subsequent compressed block. This is how data is addressed when multiple blocks are being compressed concurrently. For example, a block to which data is being written is not compressed until it reaches its maximum size (which can be configurable, but should be large enough to achieve good compression results). When a new block is generated to which data is to be written, the block position is calculated based on the number of bytes currently in the file. The block offset is the number of uncompressed bytes in blocks that are waiting to be compressed. As bytes are written to the new block, the block offset continues to grow by exactly the number of bytes written in the block. In this manner, embodiments of the present invention permit the possibility of always knowing how to find and read in those bytes written to the new block after all the blocks are compressed and written to the file.

Reading in data from a 64-bit encoded position requires skipping to the block position (e.g., encoded as 36 bits), reading in the block and decompressing it. If the block offset (e.g., encoded as 28 bits) is within the uncompressed block, then the data from the decompressed block is read in without having to decompress the next block. If the data is larger than the end of the block, then the next block is read in, decompressed and data is read from the next block. This process continues until all the data is read.

If the block offset is larger than the size of the uncompressed block, then the data must be in a subsequent compressed block. Determining how many blocks ahead the data is located can be calculated by reading the block index file 115, which stores each block's uncompressed size (e.g., in 4 bytes). By reading ahead for each uncompressed block size, it is possible to determine which block contains the data in question, without having to decompress any intervening blocks, which saves time and CPU resources. Data can span multiple compressed blocks, but that does not change any of the calculations discussed in steps 3)-5) above. If the size to be read in goes beyond the current block, then the next block is loaded, decompressed and the read continues until the size needed is satisfied.

The host device 102 should also be understood to include additional modules and other components typically found in conventional implementations of computers, servers or other host devices, although such additional modules and other components are omitted from the figure for clarity and simplicity of illustration. For example, the host device 102 can comprise various types of data compression and decompression software that operate in conjunction with the compression/decompression and data position calculation and retrieval modules 112 and 114 in system 100. Conventional aspects of such data compression and decompression processes are well known to those skilled in the art and therefore are not described in detail herein. For example, it is possible that the compression/decompression and data position calculation and retrieval modules 112 and 114 may comprise otherwise conventional data compression and/or decompression software suitably modified as disclosed herein to provide support for data compression and/or decompression. Other combinations of software, hardware and firmware may be used to implement data integrity test control logic in other embodiments.

The host device 102 and storage systems 105 in the FIG. 1 embodiment are assumed to be implemented using at least one processing platform each comprising one or more processing devices each having a processor coupled to a memory. Such processing devices can illustratively include particular arrangements of compute, storage and network resources.

The host device 102 and the storage systems 105 may be implemented on respective distinct processing platforms, although numerous other arrangements are possible. For example, in some embodiments at least portions of the host device 102 and one or both of the storage systems 105 are implemented on the same processing platform. The storage systems 105 can therefore be implemented at least in part within at least one processing platform that implements at least a portion of the host device 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 102 and storage systems 105 to reside in different data centers. Numerous other distributed implementations of one or both of the host device 102 and the storage systems 105 are possible. Accordingly, the storage systems 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host device 102, network 104, storage systems 105, memory components 106, and storage controllers 108 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing data compression and decompression functionality will be described below.

Figure 2:
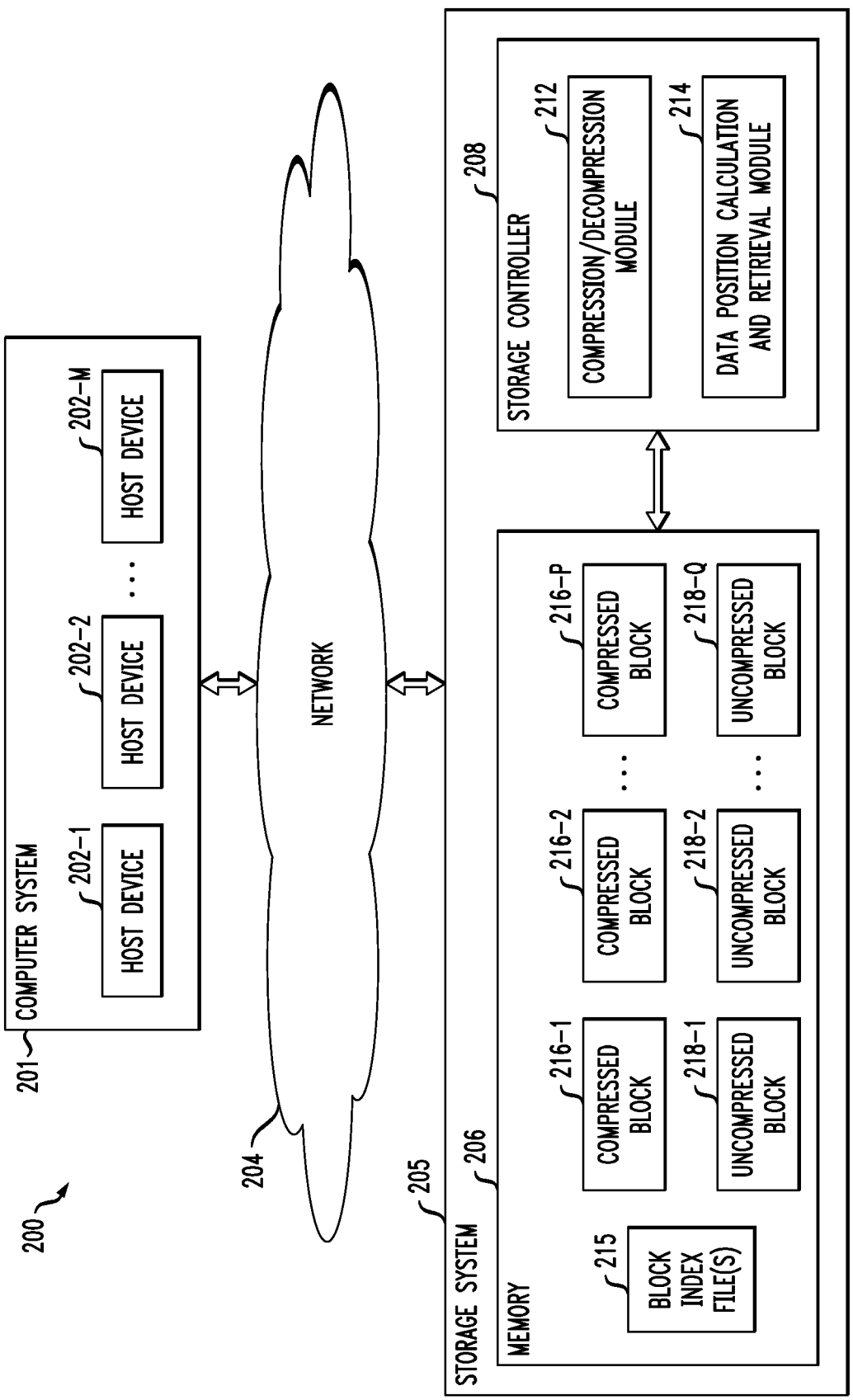
FIG. 2 is a block diagram of an information processing system comprising a storage system configured with functionality for data compression from a plurality of uncompressed data blocks having variable sizes in an illustrative embodiment.

FIG. 2 shows an information processing system 200 configured in accordance with another illustrative embodiment. The information processing system 200 comprises a computer system 201 that includes host devices 202-1, 202-2, . . . 202-M. The host devices 202 communicate over a network 204 with a storage system 205. The computer system 201 is assumed to comprise an enterprise computer system, cloud-based computer system or other arrangement of multiple compute nodes associated with respective users. The host devices 202 of the computer system 201 in some embodiments illustratively provide compute services such as execution of one or more applications on behalf of each of one or more users associated with respective ones of the host devices 202.

Similar to the storage systems 105 of system 100, the storage system 205 comprises memory components 206 and storage controller 208. However, in this embodiment, the data compression and decompression functionality is implemented in the storage system 205, rather than in one of the host devices 202. Accordingly, the storage controller 208 in this embodiment comprises modules 212 and 214, which are configured to operate in substantially the same manner as that described above for respective corresponding modules 112 and 114 of the host device 102 in the system 100. In addition, the memory component 206 of the storage system 205 of this embodiment includes one or more block index files 215, a plurality of compressed data blocks 216-1, 216-2, . . . 216-P (collectively referred to herein as compressed blocks 216), and a plurality of uncompressed data blocks 218-1, 218-2, . . . 218-Q (collectively referred to herein as uncompressed blocks 218) stored on one or more storage devices of the memory component 206, which are configured in substantially the same manner as block index file(s) 115, compressed blocks 116 and uncompressed blocks 118. In general, the compressed data blocks 116, 216 and 416 and uncompressed data blocks 118, 218 and 418 referred to herein are configured in substantially the same manner as each other, and stored on one or more storage devices of a memory component.

In some embodiments, functionality for data compression from a plurality of uncompressed data blocks having variable sizes as disclosed herein can be implemented partially in a host device and partially in a storage system. Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

The operation of the information processing systems 100 and 200 will now be described in further detail with reference to the flow diagram of the illustrative embodiment of FIG. 3. This figure illustrates a process that includes steps 300 through 306, and is suitable for use in systems 100 and 200 but is more generally applicable to other types of information processing systems in which a host device and/or storage system is configured to perform data compression and decompression. The steps of the flow diagram are illustratively performed at least in part under the control of the compression module 112 and/or data position calculation and retrieval module 114 implemented in host device 102 of system 100 or in the compression module 212 and/or data position calculation and retrieval module 214 implemented in storage controller 208 of system 200.

In step 300, a plurality of block offsets are determined by the data position calculation and retrieval module 114/214. The plurality of block offsets indicate respective positions of data within a plurality of uncompressed data blocks (e.g., data blocks 118, 218, 418), and can be respectively determined from the start of an uncompressed data block to which they correspond. The uncompressed data blocks are respectively encoded to have variable sizes.

In step 302, the method further comprises generating, by the data position calculation and retrieval module 114/214, a block index file (e.g., block index file 115, 215) comprising the plurality of block offsets, a plurality of block positions and a plurality of block sizes respectively corresponding to the plurality of uncompressed data blocks. For each uncompressed data block, the block index file designates a first number of bytes for a block offset and a block position, and second number of bytes for a block size. For example, 8 bytes can be designated for the block offset and block position, and 4 bytes for the block size. The block index file is not compressed.

In step 304, data from at least one uncompressed data block of the plurality of uncompressed data blocks is compressed by the compression/decompression module 112/212 to at least one compressed data block of a plurality of compressed data blocks (e.g., data blocks 116, 216, 416). Each of the plurality of compressed data blocks includes a block position indicating the start of a given compressed data block and a block offset of the plurality of block offsets.

In step 306, the compression/decompression module 112/212 and the data position calculation and retrieval module 114/214 utilize the block index file in connection with decompressing the compressed data. Utilizing the block index file in connection with decompressing the compressed data may comprise determining whether the block offset is within an uncompressed data block corresponding to the given compressed data block, and decompressing data from a subsequent compressed data block in an ordered sequence relative to the given compressed data block if the block offset is not within the uncompressed data block corresponding to the given compressed data block. The process may further include accessing the given compressed data block based on the block position and decompressing data from the given compressed data block.

According to an embodiment of the present invention, prior to completing the compression of the data from a first uncompressed data block to a compressed data block, data from a second uncompressed data block which is subsequent in an ordered sequence relative to the first uncompressed data block may be written to, for example, a buffer. In other words, subsequent uncompressed blocks can be written to, for example, buffer memory, before one or more prior uncompressed blocks, which may have already been written to a buffer, are finished compressing.

In accordance with an embodiment of the present invention, the plurality of block offsets respectively correspond to a number of uncompressed bytes in remaining ones of the plurality of uncompressed data blocks waiting to be compressed at a given time.

The process may be implemented in a host device configured to communicate over a network with a storage system, or in a storage system configured to communicate over a network with a host device.

Figure 3:
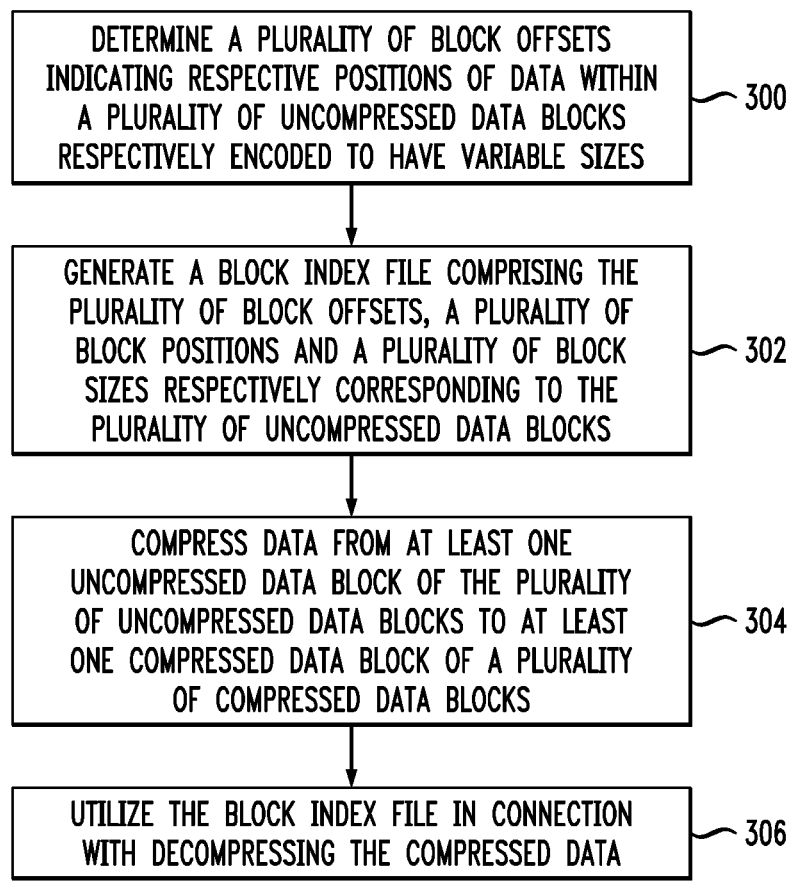
FIG. 3 is a flow diagram of a process for data compression from a plurality of uncompressed data blocks having variable sizes in an illustrative embodiment.

The particular processing operations and other system functionality described in conjunction with the flow diagram of FIG. 3 are presented by way of illustrative example only, and should not be construed as limiting the scope of the disclosure in any way. Alternative embodiments can use other types of processing operations for performing data compression and decompression. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different data compression and decompression processes for respective different datasets or for different storage systems or portions thereof within a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 208 that is configured to control performance of one or more steps of the process of the flow diagram of FIG. 3 in its corresponding system 100 or 200 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host device 102 of system 100 or the storage controller 208 of system 200, as well as other system components, may be implemented at least in part using processing devices of such processing platforms. For example, in a distributed implementation of the storage controller 208, respective distributed modules of such a storage controller can be implemented in respective containers running on respective ones of the processing devices of a processing platform.

Illustrative embodiments of host devices or storage systems with data compression and decompression functionality as disclosed herein can provide a number of significant advantages relative to conventional arrangements. For example, the embodiments of the present invention advantageously allow subsequent uncompressed blocks in a sequence of uncompressed blocks to be written while prior blocks in the sequence are still in the process of being compressed, thereby increasing throughput relative to conventional techniques. Known processes, which suffer from poor performance, require compressing one block at a time and waiting for the compression in a previous block to finish before starting writing of a new block.

In addition, illustrative embodiments provide an advantage of being able to calculate an object's position (or file address) before the size of the compressed block is fully known, and allow for variations in uncompressed block size, providing for increased flexibility in compression and decompression processing, that was not present, for example, with constant block sizes.

Some embodiments provide enhanced techniques for data compression and decompression that advantageously avoid the problems that can arise in conjunction with having to decompress a series of blocks when some of the blocks do not contain the sought after data. For example, one or more such embodiments are configured to read ahead for each uncompressed block size, making it possible to determine which block contains relevant or sought after data. As a result, the system can skip over intervening blocks not having the data in question, and only decompress those blocks with the desired data, saving time and processing resources. For example, according to an illustrative embodiment, if a block offset is larger than the size of a compressed block, then the system will conclude that the data is in a subsequent compressed block. The number of blocks ahead can be calculated by reading the block index file, which stores each block's uncompressed size.

Moreover, illustrative embodiments may include any type of host device or associated storage system comprising at least one storage device and suitably configured in accordance with the techniques disclosed herein.

Functionality for data compression from a plurality of uncompressed data blocks having variable sizes can be implemented in a host device, in a storage system, or partially in a host device and partially in a storage system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with data compression and decompression functionality will now be described in greater detail with reference to FIGS. 5 and 6. Although described in the context of systems 100 and 200, these platforms may also be used to implement at least portions of other information processing systems in other embodiments.

Figure 5:
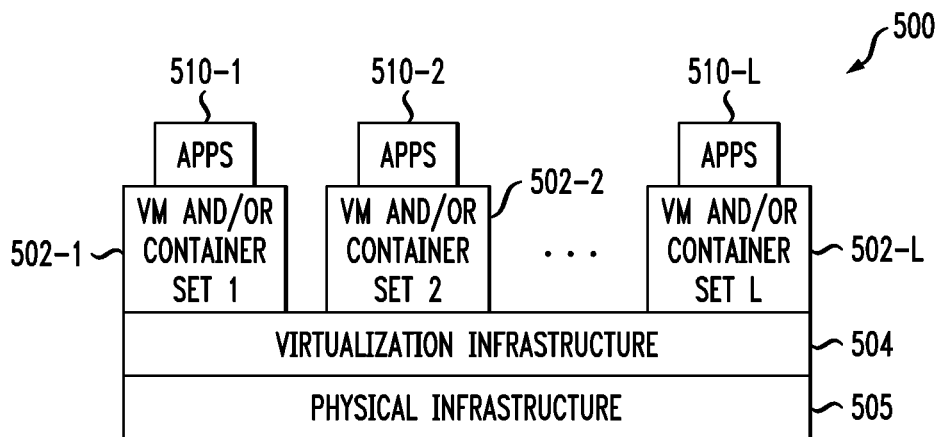
FIGS. 5 and 6 show examples of processing platforms that may be utilized to implement at least a portion of an information processing system in illustrative embodiments.
Figure 6:
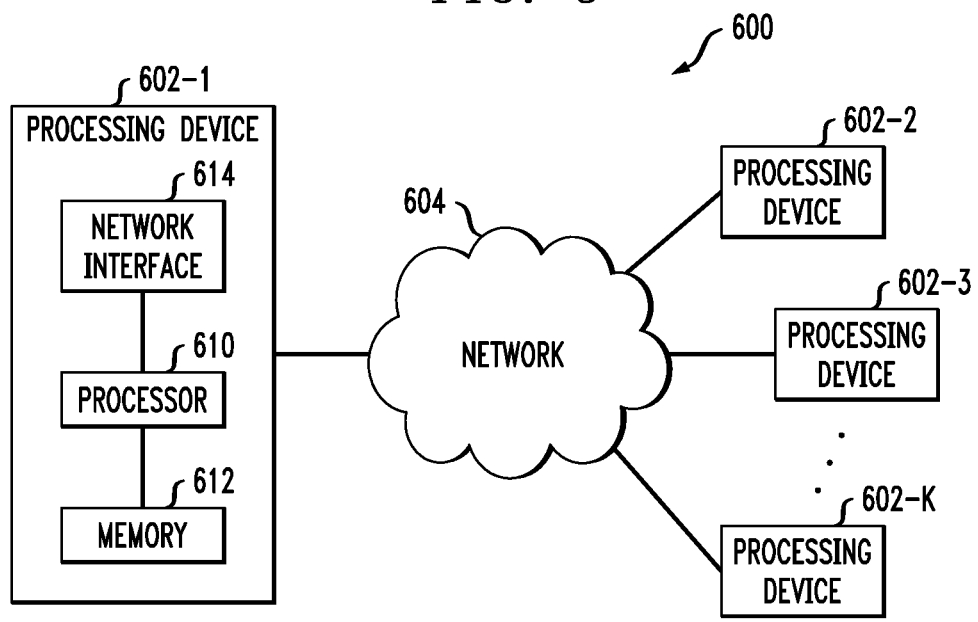

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide data compression and decompression functionality of the type described above for one or more processes running on a given one of the VMs. For example, each of the VMs can implement data compression and decompression control logic for providing data compression and decompression functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide data compression and decompression functionality of the type described above for one or more processes running on different ones of the containers. For example, a container host device supporting multiple containers of one or more container sets can implement one or more instances of data integrity test control logic for use in performing data integrity tests.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the data compression and decompression functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, data compression and decompression processes, data position calculation and retrieval processes, and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the processing device being configured:
   to determine a plurality of block offsets indicating respective positions of data within a plurality of uncompressed data blocks respectively encoded to have variable sizes;
   to generate a block index file comprising the plurality of block offsets, a plurality of block positions and a plurality of block sizes respectively corresponding to the plurality of uncompressed data blocks;
   to sequentially write the data from the plurality of uncompressed data blocks to a plurality of memory buffers corresponding to the plurality of uncompressed data blocks, wherein the plurality of uncompressed data blocks are in an ordered sequence;
   to compress data from at least a first uncompressed data block of the plurality of uncompressed data blocks to at least one compressed data block of a plurality of compressed data blocks;
   wherein the data from the first uncompressed data block is in a given memory buffer of the plurality of memory buffers prior to being compressed;
   during the compression of the data from the first uncompressed data block to the at least one compressed data block, to simultaneously write data from one or more additional uncompressed data blocks of the plurality of uncompressed data blocks to one or more of the plurality of memory buffers;
   wherein the one or more additional uncompressed data blocks are subsequent in the ordered sequence relative to the first uncompressed data block; and
   to utilize the block index file in connection with decompressing the compressed data.

2. The apparatus of claim 1 wherein the processing device is implemented in a host device configured to communicate over a network with a storage system.

3. The apparatus of claim 1 wherein the processing device is implemented in a storage system configured to communicate over a network with a host device.

4. The apparatus of claim 1 wherein the plurality of block offsets are respectively determined from the start of a corresponding uncompressed data block of the plurality of uncompressed data blocks.

5. The apparatus of claim 1 wherein, for each uncompressed data block of the plurality of uncompressed data blocks, the block index file designates a first number of bytes for a block offset and a block position, and second number of bytes for a block size.

6. The apparatus of claim 5 wherein the first number comprises 8 bytes and the second number comprises 4 bytes.

7. The apparatus of claim 1 wherein each of the plurality of compressed data blocks comprises a block position indicating the start of a given compressed data block and a block offset of the plurality of block offsets.

8. The apparatus of claim 7 wherein the processing device is further configured to access the given compressed data block based on the block position and decompress data from the given compressed data block.

9. The apparatus of claim 7 wherein, in utilizing the block index file in connection with decompressing the compressed data, the processing device is configured:
to determine whether the block offset is within an uncompressed data block corresponding to the given compressed data block; and
to decompress data from a subsequent compressed data block in an ordered sequence relative to the given compressed data block if the block offset is not within the uncompressed data block corresponding to the given compressed data block.

10. The apparatus of claim 1 wherein the block index file is uncompressed.

11. The apparatus of claim 1 wherein the plurality of block offsets respectively correspond to a number of uncompressed bytes in remaining ones of the plurality of uncompressed data blocks waiting to be compressed at a given time.

12. A method comprising:
determining a plurality of block offsets indicating respective positions of data within a plurality of uncompressed data blocks respectively encoded to have variable sizes;
generating a block index file comprising the plurality of block offsets, a plurality of block positions and a plurality of block sizes respectively corresponding to the plurality of uncompressed data blocks;
sequentially writing the data from the plurality of uncompressed data blocks to a plurality of memory buffers corresponding to the plurality of uncompressed data blocks, wherein the plurality of uncompressed data blocks are in an ordered sequence;
compressing data from at least a first uncompressed data block of the plurality of uncompressed data blocks to at least one compressed data block of a plurality of compressed data blocks;
wherein the data from the first uncompressed data block is in a given memory buffer of the plurality of memory buffers prior to being compressed;
during the compression of the data from the first uncompressed data block to the at least one compressed data block, simultaneously writing data from one or more additional uncompressed data blocks of the plurality of uncompressed data blocks to one or more of the plurality of memory buffers;
wherein the one or more additional uncompressed data blocks are subsequent in the ordered sequence relative to the first uncompressed data block; and
utilizing the block index file in connection with decompressing the compressed data;
wherein the method is implemented by at least one processing device comprising a processor coupled to a memory.

13. The method of claim 12 wherein, for each uncompressed data block of the plurality of uncompressed data blocks, the block index file designates a first number of bytes for a block offset and a block position, and second number of bytes for a block size.

14. The method of claim 12 wherein each of the plurality of compressed data blocks comprises a block position indicating the start of a given compressed data block and a block offset of the plurality of block offsets.

15. The method of claim 14 wherein utilizing the block index file in connection with decompressing the compressed data comprises:
determining whether the block offset is within an uncompressed data block corresponding to the given compressed data block; and
decompressing data from a subsequent compressed data block in an ordered sequence relative to the given compressed data block if the block offset is not within the uncompressed data block corresponding to the given compressed data block.

16. A computer program product comprising a non-transitory processor-readable storage medium having stored therein program code of one or more software programs, wherein the program code when executed by at least one processing device causes said at least one processing device:
to determine a plurality of block offsets indicating respective positions of data within a plurality of uncompressed data blocks respectively encoded to have variable sizes;
to generate a block index file comprising the plurality of block offsets, a plurality of block positions and a plurality of block sizes respectively corresponding to the plurality of uncompressed data blocks;
to sequentially write the data from the plurality of uncompressed data blocks to a plurality of memory buffers corresponding to the plurality of uncompressed data blocks, wherein the plurality of uncompressed data blocks are in an ordered sequence;
to compress data from at least a first uncompressed data block of the plurality of uncompressed data blocks to at least one compressed data block of a plurality of compressed data blocks;
wherein the data from the first uncompressed data block is in a given memory buffer of the plurality of memory buffers prior to being compressed;
during the compression of the data from the first uncompressed data block to the at least one compressed data block, to simultaneously write data from one or more additional uncompressed data blocks of the plurality of uncompressed data blocks to one or more of the plurality of memory buffers;
wherein the one or more additional uncompressed data blocks are subsequent in the ordered sequence relative to the first uncompressed data block; and
to utilize the block index file in connection with decompressing the compressed data.

17. The computer program product of claim 16 wherein each of the plurality of compressed data blocks comprises a block position indicating the start of a given compressed data block and a block offset of the plurality of block offsets.

18. The computer program product of claim 17 wherein, in utilizing the block index file in connection with decompressing the compressed data, the program code when executed by the at least one processing device causes said at least one processing device:

to determine whether the block offset is within an uncompressed data block corresponding to the given compressed data block; and to decompress data from a subsequent compressed data block in an ordered sequence relative to the given compressed data block if the block offset is not within the uncompressed data block corresponding to the given compressed data block.

19. The computer program product of claim 16 wherein the plurality of block offsets respectively correspond to a number of uncompressed bytes in remaining ones of the plurality of uncompressed data blocks waiting to be compressed at a given time.

20. The method of claim 12 wherein the plurality of block offsets respectively correspond to a number of uncompressed bytes in remaining ones of the plurality of uncompressed data blocks waiting to be compressed at a given time.

* * * * *